United States Patent [19]

Matsuda et al.

[11] Patent Number: 4,752,424
[45] Date of Patent: Jun. 21, 1988

[54] METHOD OF MANUFACTURING A RARE EARTH OXYSULFIDE CERAMIC

[75] Inventors: Naotoshi Matsuda, Kawasaki; Masaaki Tamatani, Fujisawa; Kazuto Yokota, Yokohama, all of Japan

[73] Assignee: Kabushiki Kaisha Toshiba, Kawasaki, Japan

[21] Appl. No.: 4,574

[22] Filed: Jan. 20, 1987

[30] Foreign Application Priority Data

Jan. 30, 1986 [JP] Japan ................................ 61-16836
Jul. 29, 1986 [JP] Japan ................................ 61-178304

[51] Int. Cl.⁴ .................... B29D 11/00; B29C 43/00; C01B 17/45; C04B 35/00
[52] U.S. Cl. .................................... 264/1.2; 501/126; 501/140; 501/152; 264/1.1; 264/325; 423/263; 423/5.2 R
[58] Field of Search ............... 501/126, 152, 140; 264/1.1, 1.2, 325; 419/49; 423/263, 512 R

[56] References Cited

U.S. PATENT DOCUMENTS

| | | | |
|---|---|---|---|
| 3,340,053 | 9/1967 | Hodge et al. | 419/49 X |
| 3,562,371 | 2/1971 | Bush | 419/49 X |
| 4,108,652 | 8/1978 | Ogawa et al. | 264/62 X |
| 4,242,221 | 12/1980 | Cusano et al. | 252/301.4 H |
| 4,461,750 | 7/1984 | Chess et al. | 501/152 X |
| 4,490,319 | 12/1984 | Lee et al. | 501/87 X |
| 4,560,668 | 12/1985 | Hunold et al. | 264/63 X |
| 4,571,312 | 2/1986 | Greskovich et al. | 264/1.2 |
| 4,571,414 | 2/1986 | Renlund et al. | 501/90 X |
| 4,572,803 | 2/1986 | Yamazoe et al. | 252/301.16 X |
| 4,578,129 | 3/1986 | Rowe | 75/951 X |

FOREIGN PATENT DOCUMENTS

| | | | |
|---|---|---|---|
| 60167 | 9/1982 | European Pat. Off. | 419/49 |
| 48-25605 | 7/1973 | Japan | 419/49 |
| 58-204088 | 11/1983 | Japan . | |

OTHER PUBLICATIONS

Hamano, *Fine Ceramics Handbook*, Asakura Shoten (1984) chapter 3, section 2.

*Primary Examiner*—William R. Dixon, Jr.
*Assistant Examiner*—Andrew B. Griffis
*Attorney, Agent, or Firm*—Oblon, Fisher, Spivak, McClelland & Maier

[57] ABSTRACT

There is provided a method of manufacturing a ceramic, wherein a ceramic material is covered with a foil of a metal selected from the group consisting of molybdenum, tungsten, platinum, and rhenium, sealed into an airtight vessel of tantalum or niobium, and then subjected to a hot isostatic press process. The method of the present invention can suppress coloration produced in the hot isostatic press.

5 Claims, 2 Drawing Sheets

METHOD OF MANUFACTURING A RARE EARTH OXYSULFIDE CERAMIC

BACKGROUND OF THE INVENTION

The present invention relates to a method of manufacturing a ceramic and, more particularly, to a method of manufacturing a rare earth oxysulfide ceramic.

According to a description of Japanese Patent Disclosure (Kokai) No. 58-204088, a ceramic of a fluorescent material obtained by partially substituting a rare earth oxysulfide ($RE_2O_2S$; RE is a rare earth element) with another rare earth element such as $Gd_2O_2S:Pr$ can be used for a scintillation detector. In this case, in order to obtain a large amount of light emission from the ceramic, the ceramic must have small light loss and high light transmittance. In addition, coloration, i.e., light absorption of the ceramic, and light scattering due to pores or segregates inside the ceramic must be suppressed.

A ceramic with less pores and less inclusions is conventionally manufactured by the hot press method or the hot isostatic press method. This is because an additive material may be left as segregates in the pressure-less-sintering process when it is used to obtain high-density ceramics.

However, in the hot press method, no shield is present between a ceramic material and ambient atmosphere and the ceramic material tends to be adversely affected by high-temperature atmosphere. Therefore, when a rare earth oxysulfide likely to be decomposed at a high temperature is used as a material, coloration or degradation of emission efficiency of the ceramic occurs upon decomposition.

On the other hand, with the hot isostatic press method in which a material is sealed in an airtight vessel and a hot isostatic press process is performed, the above decomposition does not occur because a shield is present between the material and the atmosphere. However, since the airtight vessel and the ceramic material are in direct contact with each other, coloration tends to occur due to the reaction between the vessel and the material or diffusion of a metal constituting the vessel into the ceramic.

SUMMARY OF THE INVENTION

The present invention has been made in consideration of the above problems, and has as its object to provide a method of manufacturing a ceramic capable of suppressing coloration produced in the hot isostatic press.

The present invention is characterized by covering a ceramic material with a foil of a metal selected from the group consisting of molybdenum, tungsten, platinum, and rhenium, sealing the resultant material into an airtight vessel made of tantalum or niobium, and performing the hot isostatic press.

An example of the above ceramic material is a rare earth oxysulfide such as a gadolinium oxysulfide, or a gadolinium oxysulfide obtained by partially substituting gadolinium with another rare earth element. Such a ceramic material may be subjected to the hot isostatic press process in a powdery state, but is preferably cold-pressed in advance to obtain a high density for easy handling and sintering.

An airtight vessel used for the above hot isostatic press process must satisfy the following three conditions: (1) since the hot isostatic press is performed at a high temperature, the vessel must be made of a high melting-point material capable of maintaining functions as an airtight vessel even at high temperatures; (2) the vessel must easily undergo plastic deformation because the vessel must be able to transfer pressure to the ceramic material during the hot isostatic press and, at the same time, the vessel itself must collapse as the ceramic material shrinks upon sintering; and (3) formation of the vessel and airtight sealing must be easily obtained. Tantalum and niobium satisfy the above conditions, and especially tantalum is effective. On the contrary, tungsten, for example, is not suitable due to poor plastic deformation and molding properties, although it is a refractory metal and satisfies the above condition in item (1).

A foil used in the above hot isostatic press process serves to prevent the ceramic material from directly contacting the airtight vessel during the press and must be made of molybdenum, tungsten, platinum, or rhenium, as described above. For example, although tantalum is suitable for the airtight vessel for the above hot isostatic press process, it degrades light transmittance of a rare earth oxysulfide due to coloration produced during the hot isostatic press when it is brought into contact with the rare earth oxysulfide as the ceramic material. By the way, if the foil is too thick, it cannot sufficiently transfer the pressure to the ceramic material because of its strength. Therefore, the thickness of the foil made by conventional methods is desirably less than 200 $\mu$m.

When the hot isostatic press temperature is low, sintering of the rare earth oxysulfide does not progress smoothly. At temperatures of about 1,300° C. or less, more pores are formed in the ceramic and light transmittance is degraded. On the other hand, at high temperatures exceeding about 1,800° C., coloration is produced due to decomposition of the rare earth oxysulfide or reaction thereof with the foil even when the above foil is used, so that light transmittance and luminous efficiency are degraded. Therefore, the hot isostatic press temperature is preferably between about 1,300° and 1,800° C. and, more preferably, between 1,450° to 1,650° C.

In the above hot isostatic press process, if the pressure is too low, the rare earth oxysulfide is insufficiently sintered and the number of pores formed in the ceramic increases to degrade light transmittance. For this reason, a lower limit of pressure is preferably a several hundreds atm. (several tens of MPa).

As for the timings of pressurization and heating in the hot isostatic press process, pressurization may be performed first and then heating may be performed. However, the airtight vessel may be destroyed during the process according to this method. Therefore, it is preferred to perform heating first, up to a temperature around 1,000° C., so that the airtight vessel is softened, and then to perform pressurization at a predetermined pressure. Thereafter, heating is performed again at a predetermined temperature. This method is more preferable in terms of yield because the airtight vessel tends to be destroyed less often.

As described above, a ceramic material is not directly sealed into an airtight vessel made of tantalum or niobium. It is covered in advance with a foil of a metal selected from the group consisting of molybdenum, tungsten, platinum, and rhenium and then sealed into the airtight vessel so as not to contact the vessel. Thereafter, the hot isostatic press of the material is performed to obtain a translucent rare earth oxysulfide ceramic with less pores and coloration.

Note that in the present invention, in order to reduce coloration of a ceramic (especially, a rare earth oxysulfide ceramic), a heat treatment of a rare earth oxysulfide may be effectively performed in an open air atmosphere prior to the hot isostatic press process. In the heat treatment in an open air atmosphere, the surface of a rare earth oxysulfide ($RE_2O_2S$) powder particles is oxidized to produce a small amount of $RE_2O_2SO_4$, thereby suppressing coloration. The temperature of the heat treatment is preferably 400° to 800° C. so that only $RE_2O_2S$ on the surface is converted into $RE_2O_2SO_4$ but $RE_2O_2S$ inside remains non-oxidized. Although it changes depending on the treatment temperature, a heat treatment time is preferably about 30 min. to 3 hours. The heat treatment may be performed before or after cold-pressing of the material powder.

DETAILED DESCRIPTION OF THE PREFERRED EMBODIMENTS

Example 1

Figure 1:
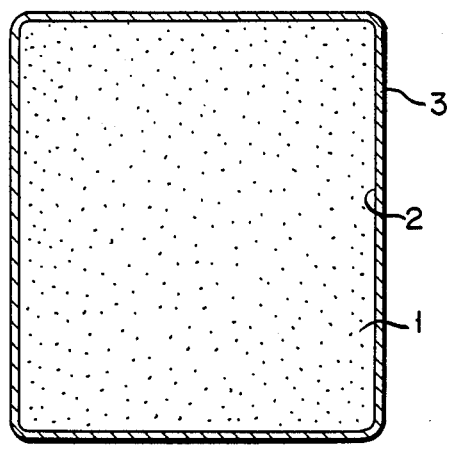
FIG. 1 is a sectional view of a package of $Gd_2O_2S$:Pr, a molybdenum foil, and an airtight vessel of tantalum in a hot isostatic press process of a $Gd_2O_2S$:Pr ceramic according to Example 1 of the present invention.

A powder of a gadolinium oxysulfide fluorescent material activated by praseodymium ($Gd_2O_2S$:Pr) was subjected to a cold isostatic press under a pressure of about 200 MPa and then shaped. A resultant material, i.e., cold-pressed fluorescent material 1, was covered with molybdenum foil 2 having a thickness of 40 μm. Subsequently, the resultant material was charged into a cylindrical capsule of tantalum having a thickness of 0.3 mm, an inner diameter of 40 mm, and a height of 50 mm. After the internal air was exhausted, airtight vessel 3 was completed by electron beam welding (FIG. 1). Thereafter, the airtight vessel was pressurized up to 50 MPa at room temperature using argon as a pressure medium, heated under pressure, and then maintained under the final conditions of 1,700° C. and 150 MPa for 1 hour. A translucent ceramic of a $Gd_2O_2S$:Pr fluorescent material was obtained by this hot isostatic press process.

Figure 2:
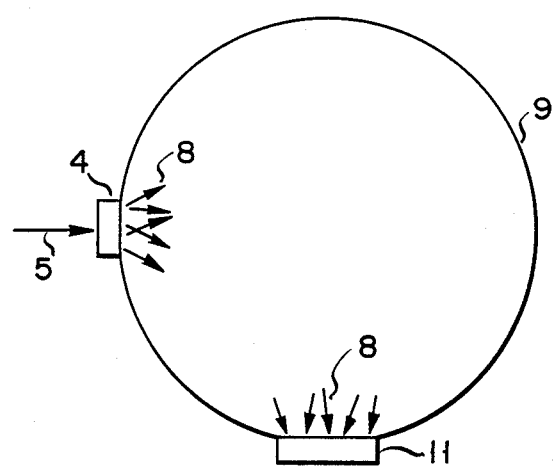
FIG. 2 is a schematic view showing a method of measuring diffuse transmittance.
Figure 3:
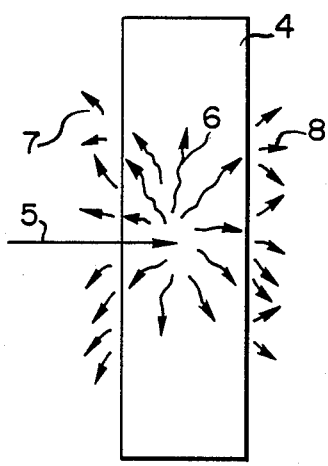
FIG. 3 is a schematic view showing behaviors of light produced when an excitation beam such as an ultraviolet beam, an electron beam, an X-ray beam, or a γ beam becomes incident on a fluorescent ceramic.

The bulk density of the above $Gd_2O_2S$:Pr ceramic was 100% with respect to crystallographic density of $Gd_2O_2S$:Pr. That is, the volume percentage of pores in the ceramic was 0. The ceramic was light gray in color, but exhibited almost no trace of coloration. The ceramic was cut into a sample plate having a thickness of 1 mm to measure diffuse transmittance with respect to an He-Ne laser beam, regular transmittance with respect to white light when slits were arranged before and behind a sample, and diffuse reflectance when the sample was placed on a white paper. As a result, diffuse transmittance was 23%, regular transmittance was 20%, and diffuse reflectance was 38%. In order to measure diffuse transmittance, He-Ne laser beam 5 was incident onto ceramic sample 4, and transmitted light 10 entered integrating sphere 9, having a diameter of 150 mm, and was then measured by detector 11, as shown in FIG. 2. The ceramic sample was a square plate, 9 mm×9 mm, with a certain thickness, e.g. 1 mm. The square surface of the plate serving as a light incident/reflecting surface was polished to obtain a mirror surface, and its sides were coated by a white paint to prevent leakage of light. An opening through which the transmitted light entered the integrating sphere was a square opening having the same size as that of the ceramic sample, and the sample was placed at the opening. Diffuse reflectance was measured by placing a sample plate with a predetermined thickness and two mirror surfaces on white paper and using a Macbeth optical densitometer (RD918). In addition, Sample 4 of the ceramic was cut out into a plate having a thickness of 2 mm, a γ beam as incident excitation beam 12 was radiated from a $^{57}$Co beam source (not shown) onto sample 4, as shown in FIG. 3, and light emission 6 was observed. As a result, although light emission toward the excitation beam 7 was found, luminous intensity of light emission observed from a transmitting (output) side 8 was sufficiently strong.

Example 2

A powder of $Gd_2O_2S$:Pr was put into an alumina crucible and subjected to a heat treatment in an electric furnace in an open air atmosphere at a temperature of 600° C. for 3 hours. Thereafter, following the same procedures as in Example 1, a translucent ceramic of $Gd_2O_2S$:Pr was manufactured.

The bulk density of the resultant $Gd_2O_2S$:Pr ceramic was 100%. The resultant $Gd_2O_2S$:Pr ceramic had a white color except for a surface portion which was in direct contact with a molybdenum foil, and exhibited no coloration. The diffuse transmittance, regular transmittance and diffuse reflectance of the ceramic were measured in the same manner as in Example 1 and found to be 39%, 30% and 49%, respectively.

Example 3

Following the same procedures as in Example 1, a cold-pressed $Gd_2O_2S$:Pr was covered with a molybdenum foil and then charged into a tantalum capsule to complete an airtight vessel. Subsequently, the vessel was heated to 1,100° C. and pressurized to about 75 MPa using argon as a pressure medium while it was kept at the same temperature. Thereafter, the vessel was subjected to heating under pressure again and maintained under the final condition of 1,500° C. and 90 MPa for 3 hours. By this hot isostatic press process, a translucent ceramic of $Gd_2O_2S$:Pr was obtained.

The bulk density of the resultant $Gd_2O_2S$:Pr ceramic was 99.9%, and the ceramic was light gray in color. Diffuse transmittance of the ceramic measured in the same manner as in Example 1 was 28.5%, luminous intensity observed at the transmitting side during irradiation of a γ beam was 190% compared with that of Example 1.

Example 4

Following the same procedures as in Example 1, except that a platinum foil was used instead of a molybdenum foil and the temperature and pressure during the hot isostatic press process were limited to 1,600° C. and 1,400 atm. (140 MPa) respectively, a translucent ceramic of $Gd_2O_2S$:Pr was manufactured.

The bulk density of the resultant $Gd_2O_2S$:Pr ceramic was 100%, and there was little internal coloration. The diffuse transmittance, diffuse reflectance and regular transmittance of the ceramic measured in the same manner as in Example 1 were 49%, 42% and 32%, respectively.

Example 5

Following the same procedures as in Example 3, except that a capsule of niobium was used instead of that of tantalum, a translucent ceramic of $Gd_2O_2S:Pr$ was manufactured.

The bulk density of the resultant $Gd_2O_2S:Pr$ ceramic was 99.9%. The diffuse reflectance and diffuse transmittance of the ceramic measured in the same manner as in Example 1 were 28% and 30%. The luminous intensity observed at the transmitting side during irradiation of a $\gamma$ beam was substantially the same as in Example 3.

Example 6

A $Gd_2O_2S:Pr$ fluorescent material powder was subjected to the cold isostatic press under a pressure of about 200 MPa and then shaped. The resultant material was subjected to a heat treatment in an electric furnace in an open air atmosphere at a temperature of 600° C. for 1 hour. Subsequently, the resultant material was covered with a molybdenum foil and charged into a tantalum capsule, thereby completing an airtight vessel. Thereafter, the vessel was subjected to the hot isostatic press in the same manner as in Example 1, so that a translucent ceramic of $Gd_2O_2S:Pr$ was manufactured.

The bulk density of the resultant $Gd_2O_2S:Pr$ was 100%. The resultant $Gd_2O_2S:Pr$ ceramic was light gray in color, except for a surface which was in direct contact with the molybdenum foil. The regular transmittance, diffuse transmittance and diffuse reflectance of the reflectance of the ceramic, measured in the same manner as in Example 1, were 23%, 26% and 38%, respectively.

Control 1

Using a carbon mold coated with boron nitride powder as an inner-lining material, a $Gd_2O_2S:Pr$ ceramic was manufactured by a hot press process in vacuum under the conditions of 1,600° C. and 40 MPa.

The bulk density of the resultant ceramic was 99.6%, and the ceramic was gray in color. The diffuse transmittance of the ceramic with respect to an He-Ne laser beam, measured in the same manner as in Example 1, was 1% or less, and light emission observed at the transmitting side during irradiation of a $\gamma$ beam was less than the detection limit. Thus, a rare earth oxysulfide ceramic manufactured by a method other than the hot isostatic press using an airtight vessel has significantly degraded light transmittance and luminous efficiency.

Example 7

A $Gd_2O_2S:Pr$ powder was cold-pressed, shaped, covered with a molybdenum foil, and then sealed into an airtight vessel of tantalum. The resultant sample was heated to 1,100° C. in an argon atmosphere and then pressurized up to about 75 MPa using argon as a pressure medium while it was kept at the same temperature. The sample was again subjected to heating under pressure again and maintained under the final conditions of 1,450° C. and 90 MPa for 3 hours. By this hot isostatic press process, a $Gd_2O_2S:Pr$ ceramic was obtained. The bulk density of the ceramic was 99.9% with respect to crystallographic density, and the diffuse transmittance of a 2 mm-thick sample with respect to light in the visible range was 30.5%.

When X-rays were radiated onto a detector obtained by bringing a silicon photodiode into contact with a 2 mm-thick ceramic, a signal indicated a high sensitivity 220% that of a detector obtained by combining a $CdWO_4$ single crystal and a silicon photodiode. In addition, using $^{241}Am$ and $^{57}Co$ as $\gamma$ beam sources having different photon energies (60 keV and 122 keV, respectively), a ratio of signals of the ceramic detector and the $CdWO_4$ single-crystal detector described above was examined for respective $\gamma$ beams. A ratio of the magnitudes of the signals for the $\gamma$ beam from $^{57}Co$ was larger by 1.5% than that from $^{241}Am$. This indicates that linearity of the detector using a ceramic in Example 7 with respect to energies of 60 to 122 keV is degraded only by 1.5% that of the $CdWO_4$ single-crystal detector.

Example 8

Following the same procedures as in Example 7, except that the final treatment temperature was 1,600° C. and the final treatment pressure was 97 MPa, a $Gd_2O_2S:Pr$ ceramic was manufactured. The bulk density of the ceramic was 100% with respect to true specific gravity, and the diffuse transmittance of a 2 mm-thick sample with respect to light in visible range was 20.5%. An output signal of a detector obtained by combining the above 2 mm-thick ceramic and a silicon photodiode was 160% that of a $CdWO_4$ single-crystal detector. The linearity, measured in the same manner as in Example 7, was lower only by 8.5% than that of the $CdWO_4$ single-crystal detector. That is, an amount of deviation was found to be small.

Example 9

Following the same procedures as in Example 7, except that lanthanum oxysulfide obtained by partially substituting lanthanum with terbium ($La_2O_2S:Tb$) was used as a material, and that the final treatment temperature was 1,500° C. and the final treatment pressure was 90 MPa, the hot isostatic press process was performed to manufacture an $La_2O_2S:Tb$ ceramic. The bulk density of the ceramic was 99.9% with respect to crystallographic density, and the diffuse transmittance of a 2 mm-thick sample with respect to light in visible range was 30.0%. An output signal of a detector obtained by combining the above 2 mm-thick ceramic and a silicon photodiode was 330% that of a $CdWO_4$ single-crystal detector. In addition, linearity measured in the same manner as in Example 7 was degraded only by 2.2% than that of the $CdWO_4$ single-crystal detector. That is, an amount of deviation was found to be small.

Control 2

A $Gd_2O_2S:Pr$ powder was cold-pressed under a pressure of 200 MPa, and then cut into a 2 mm-thick sample. The transmittance of this pressed material was 0. This material was combined with a photodiode to obtain a detector. But an output signal of the detector during irradiation of an X-ray beam was under the detection limit.

Control 3

A $Gd_2O_2S:Pr$ powder was cold-pressed, shaped and then directly sealed into an airtight vessel of tantalum without using a molybdenum foil. Thereafter, the vessel was pressurized to 50 MPa at room temperature using argon as a pressure medium. Then, the vessel was subjected to heating under pressure and maintained under the final conditions of 1,700° C. and 150 MPa for 1 hour. With this hot isostatic press process, a $Gd_2O_2S$:Pr ceramic was manufactured. The bulk density of the resultant $Gd_2O_2S$:Pr ceramic was 100% with respect to crystallographic density, as in the case with Example 1. However, this ceramic was purple gray in color and exhibited severer coloration than that of the ceramic in Example 1. A plate having a thickness of 1 mm was cut from the ceramic, as in the case with Example 1, and diffuse transmittance with respect to an He-Ne laser beam was measured. As a result, diffuse transmittance was 16%, which was lower than that of the ceramic in Example 1. In addition, the ceramic was cut into a plate having a thickness of 2 mm, and a $\gamma$ beam was radiated onto this sample. As a result, luminous intensity observed at the transmitting side was about 20% that of Example 1. An output signal of a detector obtained by combining the above 2 mm-thick ceramic with a silicon photodiode was about 20% that of a $CdWO_4$ single-crystal detector. Furthermore, the linearity, measured in the same manner as in Example 7, was degraded by 17.5% than that of the $CdWO_4$ single-crystal detector. That is, the above ceramic was found not to be suitable for practical use.

Note that in the above embodiment, the description has been made with reference to $Gd_2O_2S$:Pr or $La_2O_2S$:Tb. However, the same effect can be achieved by another rare earth oxysulfide or a fluorescent material such as $Y_2O_2S$:Eu or $(La, Gd)_2O_2S$:Tb.

What is claimed is:

1. A method of manufacturing rare earth oxysulfide ceramics, wherein at least one rare earth oxysulfide ceramic material pretreated by a cold press is covered with a foil of a metal selected from the group consisting of molybdenum, tungsten, platinum, and rhenium, sealed into an airtight vessel of tantalum or niobium, and then subjected to a hot isostatic press process.

2. A method according to claim 1, wherein said rare earth oxysulfide is a gadolinium oxysulfide or a gadolinium oxysulfide obtained by partially substituting gadolinium with another rare earth element.

3. A method according to claim 1, wherein said foil is made of molybdenum, and said airtight vessel is formed of tantalum.

4. A method according to claim 1, wherein the rare earth oxysulfide is subjected to a heat treatment in an ambient atmosphere prior to said hot isostatic press process.

5. A method according to claim 1, wherein said hot isostatic press process is performed at a temperature of 1,300° to 1,800° C.

* * * * *